United States Patent [19]

Ruegg

[11] Patent Number: 4,905,975
[45] Date of Patent: Mar. 6, 1990

[54] CLAMPING DEVICE WITH MECHANICAL SERVO MECHANISM

[75] Inventor: Walter Ruegg, Ettenhausen, Switzerland

[73] Assignee: Gressel AG, Aadorf, Switzerland

[21] Appl. No.: 229,907

[22] Filed: Aug. 8, 1988

[30] Foreign Application Priority Data

Sep. 1, 1987 [DE] Fed. Rep. of Germany ....... 3729093

[51] Int. Cl.$^4$ ................................................ B25B 1/14
[52] U.S. Cl. ................................. 269/240; 269/228
[58] Field of Search ............... 269/228, 240, 243, 245, 269/254 R

[56] References Cited

U.S. PATENT DOCUMENTS

| | | | |
|---|---|---|---|
| 3,188,077 | 6/1965 | Olson | 269/240 |
| 3,306,604 | 2/1967 | Christensen | 269/240 |
| 4,384,707 | 5/1983 | Poot | 269/240 |

Primary Examiner—Judy J. Hartman
Attorney, Agent, or Firm—Flynn, Thiel, Boutell & Tanis

[57] ABSTRACT

A clamping device with a mechanical servo mechanism having an axially movable plunger (3) and a clamping sleeve (6) which surrounds the servo mechanism and which engages by an external thread (6a) in an internal thread (2a) of a stationary housing (2). A clamping member (7), one end of which is supported on the plunger (3), is axially slidable in and non-rotatably connected to the clamping sleeve (6). Furthermore, an abutment (9) connected to an operating lever (10) is rotatable to a limited extent in the clamping sleeve (6). Between the clamping member (7) and the abutment (9) are disposed several studs (11). The external thread (6a) is provided directly on the outer circumference of the clamping sleeve (6), concentrically to the region of the clamping member (7) and the studs (11). A compression spring (15) is supported at one end on the housing (2) and at the other end on the plunger (3, 4), and acts via the latter on the clamping member (7). An adjusting sleeve (14) is axially slidable relative to the clamping sleeve (6) by means of a fine thread (14a), and between the side of the abutment (9) facing away from the studs (11) and the adjusting sleeve (14) are disposed several cup springs (12). Rotational movement of the clamping sleeve (6) is limited relative to the housing (1) in the direction of opening by stop faces (19a, 20).

11 Claims, 2 Drawing Sheets

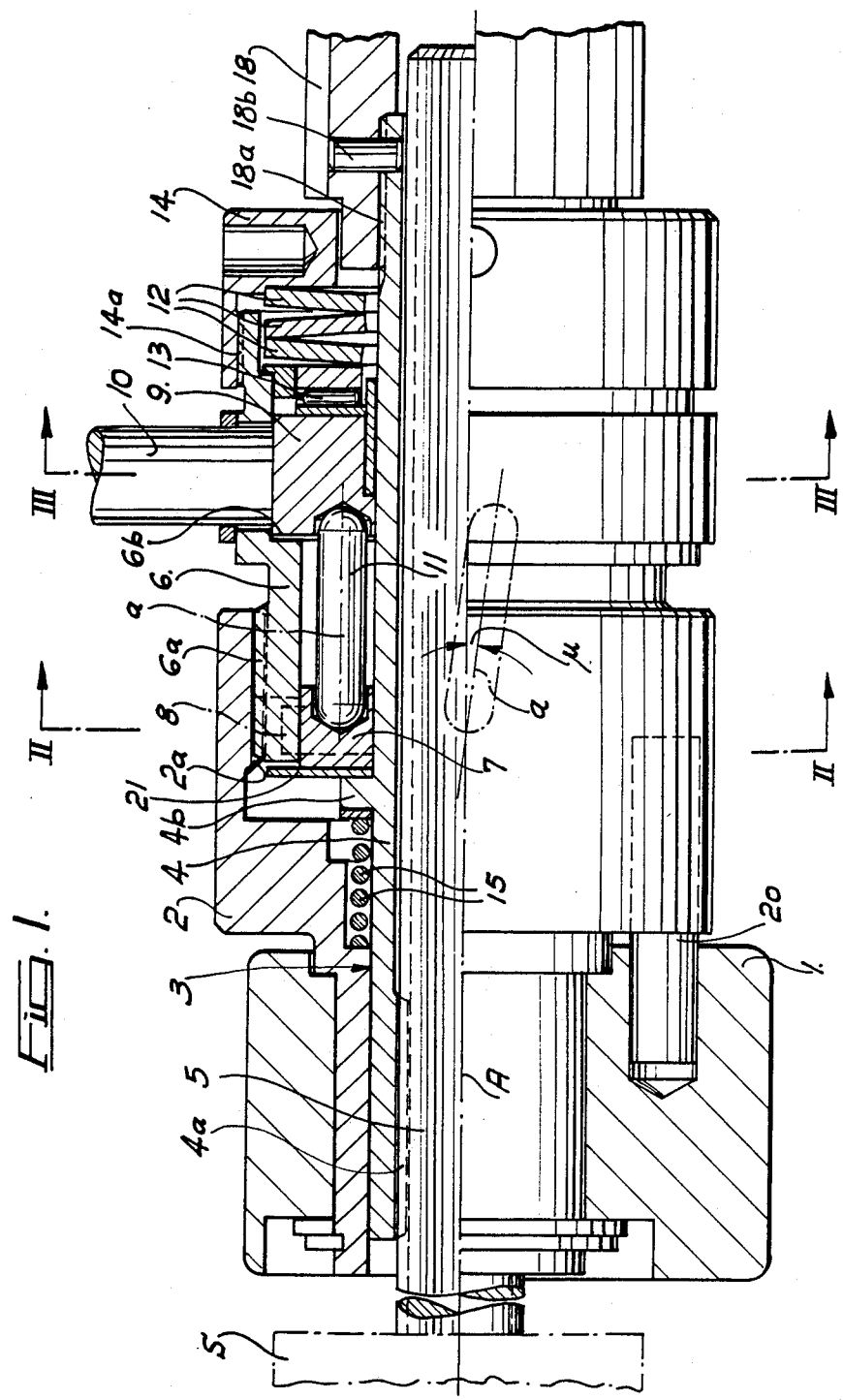

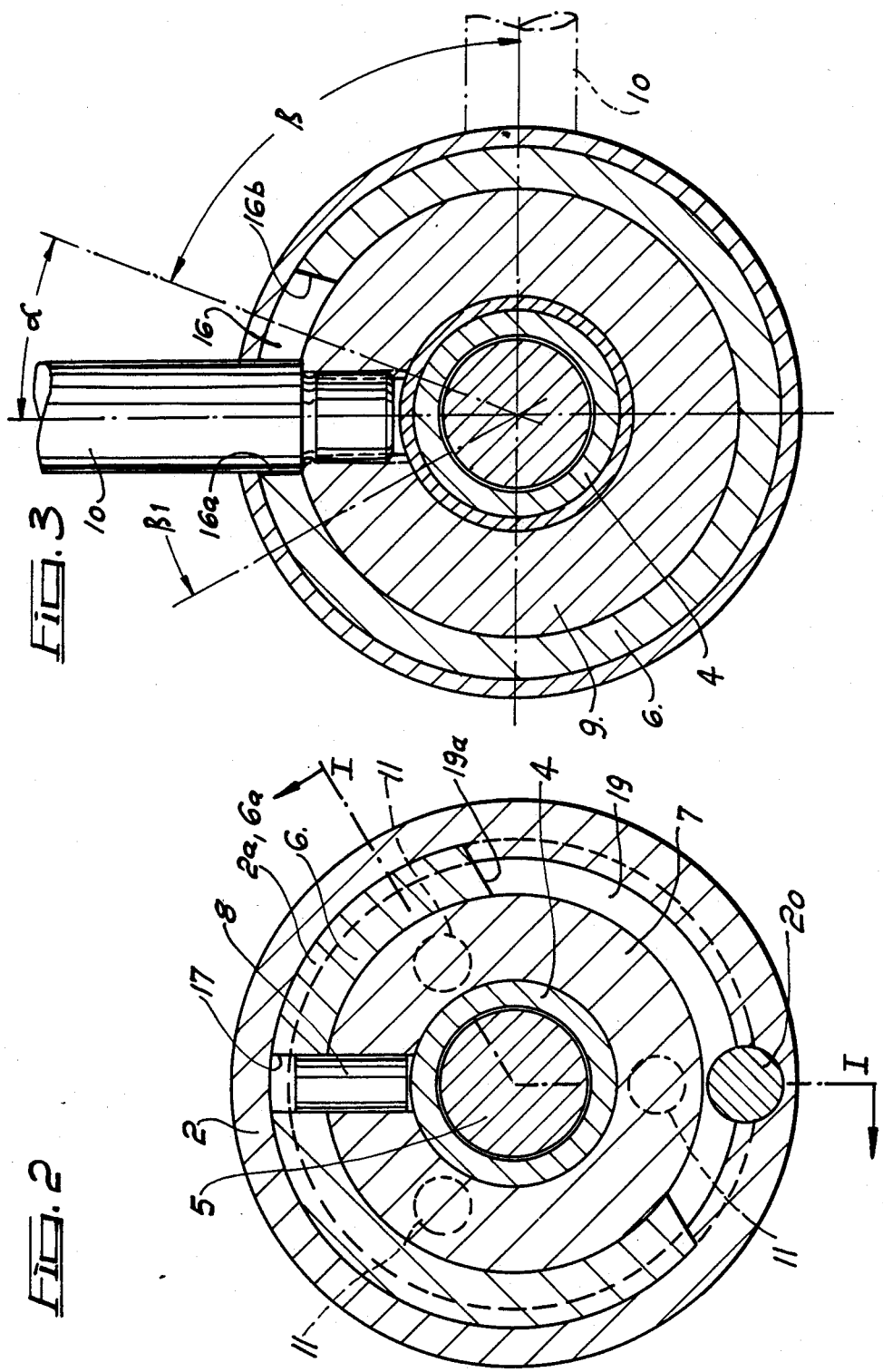

CLAMPING DEVICE WITH MECHANICAL SERVO MECHANISM

FIELD OF THE INVENTION

The invention relates to a clamping device with a mechanical servo mechanism, with an axially movable plunger acting in particular on a movable clamping slide of a machine vise or the like, with a clamping sleeve which surrounds the servo mechanism, is arranged coaxially with the plunger and engages by an external thread in an internal thread of a stationary housing, with a clamping member which is axially slidable in the clamping sleeve and non-rotatably connected thereto and one end of which is supported on the plunger, with an abutment which is axially supported and rotatable to a limited extent in the clamping sleeve and which is connected to an operating lever projecting from the clamping sleeve, with several studs which are disposed between the clamping member and the abutment and which in one end position (open position) of the abutment are inclined at an acute angle to the axis of the clamping sleeve and in the other end position (clamping position) of the abutment are arranged approximately parallel to the axis of the clamping sleeve, with a compression spring which acts on one end of the clamping member and biases it towards the studs, and with an adjusting sleeve disposed at the abutment end of the clamping sleeve.

BACKGROUND OF THE INVENTION

In a known clamping device of this kind (West German patent application 1 283 168), one end of the clamping sleeve is provided with a hollow spindle which in turn engages in the internal thread of the vise housing. The hollow spindle has a diameter less than the outside diameter of the clamping sleeve. The clamping sleeve and the hollow spindle are rotatable relative to the housing through more than 180° by means of a crank handle which engages the abutment. The hollow spindle is supported by its free end on one end of the clamping slide of a machine vise. This clamping slide comprises at its other end a driver plate which engages by a corresponding opening in an annular groove of the hollow spindle. In order for the plunger to be able to perform its clamping stroke, there must be sufficient axial play between the driver plate and the annular groove. This known clamping device has various drawbacks. It has a relatively long overall axial length, which is due to the fact that the hollow spindle is provided adjacent to the clamping sleeve, and that furthermore between the clamping sleeve and the thread of the hollow spindle there must be space for the annular groove and the driver plate. As the diameter of the hollow spindle is less than that of the bearing bush, when an ordinary self-locking thread is used it has only a relatively low pitch. This is a particular disadvantage during quick-action clamping of workpieces. During quick-action clamping of workpieces, several workpieces of the same size are clamped successively in a machine vise or other apparatus. For this, it is necessary to move the movable jaw about 2–4 mm away from the workpiece, so that the workpiece can be placed in the vise or clamping device conveniently. In order to achieve the desired feed or opening stroke of 4 mm, at least half a turn of the crank handle is required. Added to this, however, is another angle of rotation of the crank handle, which is needed after the clamping slide has come into contact with the workpiece in order to turn the abutment relative to the clamping member, to move the studs in the process out of their position at an angle to the clamping sleeve axis, into an approximately parallel position or slightly beyond the dead center position. Here too, the play required between annular groove and driver plate becomes apparent as a disadvantage. For the fact is that the hollow spindle must be moved at each feed stroke by rotation so far away from the driver plate that there is sufficient play between driver plate and annular groove, and movement of the clamping slide during the clamping stroke is not impeded. To perform the feed stroke and the clamping stroke and, conversely, to open the clamping device, nearly one full turn of the crank handle is required. During quick-action clamping of workpieces, however, the angle of rotation of the operating lever should be as small as possible, and on no account exceed 180°. Another drawback of the known clamping device lies in that the clamping pressure cannot be adjusted exactly. To adjust the clamping pressure, at the abutment end of the clamping sleeve there is of course provided an adjusting sleeve which comprises a stop face for a stop pin connected to the abutment. Another stop face is provided on the bearing bush. The adjusting sleeve can be latched by means of serrations in various rotational positions relative to the clamping sleeve, so that the distance between the two stop faces and hence also the maximum angle of rotation of the abutment can be adjusted. But the clamping force can be adjusted only very coarsely by limiting the angle of rotation. If, after the end of the clamping stroke, the workpiece yields slightly, then the clamping force drops immediately and the workpiece is no longer held securely enough. In addition to these disadvantages, the known clamping device has the further disadvantage that the bearing bush can rotate through more than 360°. Consequently, the angular range within which the crank handle must be moved to perform the feed and clamping strokes may be repeatedly in a different range, referred to one full turn of the crank handle.

It is therefore the object of the invention, on the basis of a clamping device of the kind mentioned hereinbefore, to provide a quick-action clamping device which is suitable for quick-action clamping of workpieces and the like and at the same time has a short overall axial length, which requires only a small angle of rotation of the operating lever within a predetermined angular range to perform the feed and clamping strokes or the opening stroke, and in which the clamping pressure can be adjusted easily and precisely and is maintained even in case of yielding of the workpiece.

According to the invention, this is achieved by the fact that
 (a) the external thread is provided directly on the outer circumference of the clamping sleeve, concentrically to the region of the clamping member and the studs,
 (b) the compression spring is supported at one end on the housing and at the other end on the plunger, and acts via the latter on the clamping member,
 (c) the adjusting sleeve is axially displaceable relative to the clamping sleeve by means of a fine thread, and several cup springs are disposed between the side of the abutment facing away from the studs and the adjusting sleeve, and (d) rotational movement of the clamping sleeve relative to the housing is limited by stop faces in the direction of opening.

Arrangement of the external thread on the outer circumference of the clamping sleeve has two important functions. Firstly, the overall axial length of the clamping device is shortened thereby and its structure simplified. Secondly, the external thread has a relatively large diameter, so that the external thread can have a relatively large pitch, and yet self-locking is still guaranteed. The large pitch has the advantage that the desired opening stroke of 2–4 mm is achieved with a relatively small angle of rotation. For example, with a total angle of rotation of the operating lever of 120°, which includes the angular movement required to perform the clamping stroke, a feed or opening stroke of over 3 mm can be achieved. As the compression spring is supported on the plunger, it likewise has two functions: it biases the plunger into its open position during the opening stroke. The clamping slide can therefore be rigidly connected to the plunger, and it is not necessary to provide axial play. This too reduces the angle of rotation of the operating lever. By means of the adjusting sleeve, which is axially displaceable relative to the clamping sleeve, the bias of the cup springs can easily be altered and hence the clamping pressure can be adjusted precisely according to a scale. The resilient mounting of the abutment on the cup springs furthermore has the advantage that in case of yielding of the workpiece, the clamping pressure is maintained.

BRIEF DESCRIPTION OF THE DRAWINGS

The invention is explained in more detail below with reference to a practical example shown in the drawings, in which:

FIG. 1 is an axial partial section through line I—I of FIG. 2;

FIG. 2 is radial section through line II—II of FIG. 1; and

FIG. 3 is a radial section through line III—III of FIG. 1.

DETAILED DESCRIPTION

The housing 2 is non-rotatably and axially non-slidably, i.e. rigidly connected to the stationary portion 1 of a machine vise, jig or other chucking device. Instead of the connection shown in FIG. 1, any other rigid connection may be provided, for example, the housing 2 can be screwed into the stationary portion 1 or be made in one piece with the latter. The plunger 3 is mounted axially slidably in the housing 2. In the practical example shown of the clamping device, which is intended for a machine vise, this plunger 3 consists of an internally threaded hollow spindle 4 and an externally threaded rod 5 disposed inside the hollow spindle. The hollow spindle 4 is mounted rotatably in the housing 2, and engages by a thread 4a in the thread of the threaded rod 5. The threaded rod 5 is rigidly connected by its free left end, which projects beyond the hollow spindle 4, to the slide S of the machine vise shown in dot-dash lines. The other end of the hollow spindle 4 is connected to an operating handle 18.

If the clamping device according to the invention is to be used in a chucking device, for example a jig, with a predetermined span, the plunger 3 can be constructed in one piece. Its free end projecting to the left beyond the housing 2 would then be directly connected to the slide of the clamping device.

A clamping sleeve 6 is disposed concentrically to the plunger 3. The clamping sleeve 6 surrounds a servo mechanism. The latter comprises a clamping member 7, an abutment 9 and studs 11 between the two components. The clamping member 7 and the abutment 9 are constructed as rings and mounted rotatably on the plunger 3—on its hollow spindle 4 in the practical example shown. The clamping sleeve 6 is mounted rotatably on the abutment 9. In the clamping member 7 is mounted a radial driver pin 8 which, as can be seen from FIG. 2, engages in an axial slot 17 of the clamping sleeve 6. The slot 17 has a length greater than the diameter of the driver pin 8, so that the clamping sleeve 6 and the clamping member 7 are connected to each other axially displaceably but non-rotatably, by means of the driver pin 8 and the slot 17. Into the abutment 9 is screwed a radially disposed operating lever 10 which extends through a slot 16 of the clamping sleeve extending in a circumferential direction. The two ends 16a and 16b of the slot 16 form stops for the operating lever, whereby, as can be seen from FIG. 3, the angle of rotation α of the operating lever 10 and hence also that of the abutment 9 relative to the clamping sleeve 6 is limited. The abutment 9 is axially slidable in the clamping sleeve 6. Between the abutment 9 and the clamping member 7 are provided a total of three studs 11 which are offset from each other in a circumferential direction by 120° each. In one end position of the abutment 9 which corresponds to the unclamped open position of the clamping device, the studs 11 adopt an acute angle μ of, for example, 10° to the axis A of the clamping sleeve 6, as shown in dot-dash lines in FIG. 1. In the one end position of the abutment 9, the operating lever 10 abuts against stop 16b. The other end position of the annular abutment 9 is determined by stop 16a, against which the operating lever 10 abuts in the clamping position of the clamping device. When the operating lever 10 is pivoted out of its one end position into its other position where it abuts against stop 16a, the ends of the studs 11 which engage in the abutment 9 are entrained, so that the angle μ between the stud axes a and the clamping sleeve axis A decreases and becomes 0° shortly before reaching the clamping position. The dimensions of stop 16a are such that in the clamping position of the abutment, the studs are always moved slightly beyond their position parallel to the clamping sleeve axis, i.e. beyond their dead center position, whereby reliable locking of the clamping device is achieved.

The clamping sleeve 6 is provided with an external thread 6a on its outer circumference in the region of the clamping member 7 and the studs 11. This external thread is appropriately designed as a coarse thread. In the practical example shown, the external thread 6a is a trapezoid thread Tr 52×12, i.e. it has a pitch or lead of 12 mm. Ordinary trapezoid threads as per DIN 103, on the other hand, have in order of preference for a diameter of 52 mm a pitch of only 8 mm. As the pitch of the external thread 6a is critical to the feed or opening stroke, which can be obtained with a predetermined angle of rotation of the operating lever 10, and as the external thread 6a must always exhibit self-locking, the pitch cannot be increased as much as desired. For this reason it is advantageous if the external thread has a nominal diameter of at least 44 mm for a pitch of at least 10 mm.

The external thread 6a of the clamping sleeve 6 engages in a corresponding internal thread 2a of the housing 2.

At the abutment end of the clamping sleeve 6 is disposed the adjusting sleeve 14, which is axially displaceable relative to the clamping sleeve 6 by means of a fine thread 14a. Several cup springs 12 are disposed between the side of the abutment 9 facing away from the studs 11 and the adjusting sleeve 14, a needle roller bearing 13 being provided between the cup springs 12 and the abutment 9 to reduce friction. By turning the adjusting sleeve 14 relative to the clamping sleeve 6, the force of the cup spring assembly can be set between 1 kN and 10 kN, and with it the clamping force which can be obtained with the clamping device.

Between the housing 2 and a flange 4b provided on the hollow spindle 4 of the plunger 3 is provided a compression spring 15. This compression spring 15 biases the plunger 3 or hollow spindle 4 to the right into the open position, and also ensures that the studs 11 remain in their position at an angle to the clamping sleeve axis A during the feed stroke.

In order for the operating lever 10 always to move within a predetermined angular range during clamping and opening of the clamping device, which is of critical importance to a quick-action clamping device, rotational movement of the clamping sleeve 6 relative to the housing 2 in the direction of opening is limited by stop faces. In the practical example shown, these stop faces are formed by the fact that the clamping sleeve 6 comprises at its front end a recess 19 which extends over part of its circumference. One end 19a of this recess 19 forms a first stop face. The counter-stop face is formed by the holding pin 20 which, in the practical example shown, simultaneously serves to prevent rotation between the stationary portion 1 and the housing 2.

The mode of operation is as follows.

For coarse adjustment of the span of the machine vise, the hollow spindle 4 is turned by means of the operating handle 18 connected to the hollow spindle 4 by means of a thread 16a and a radial pin 18b. By its internal thread 4a, the threaded rod and hence the slide S is displaced. The span of the machine vise can be adjusted infinitely variably. In practice, the span is set to about 2 mm larger than the dimension of the workpiece to be clamped, so that it can be placed unimpeded in the machine vice.

Clamping and unclamping (quick-action clamping) of the workpiece is carried out by means of the operating lever 10. The drawings are showing the clamping device in its clamped position. In the open or unclamped position position of the clamping device or machine vise, the clamping sleeve is rotated so far to the right from the position shown in FIG. 2, that the stop face 19a abuts against the holding pin 20. Moreover, as in FIG. 3 the annular abutment 9 is pivoted so far to the right that the operating lever 10 abuts against the stop 16b. The operating lever 10 then adopts the position shown in dot-dash lines in FIG. 3 in the open position. By pivoting the operating lever 10 anti-clockwise to the left as in FIG. 3, the abutment 9 is rotated. Under the influence of the compression spring 15, whose compression is sufficient to hold the studs 11 in their position at an angle to the clamping sleeve axis A, during this initial anti-clockwise rotation of the abutment 9 the clamping member 7 too is entrained in the same direction of rotation. As the clamping member 7 is non-rotatably connected to the clamping sleeve 6 by the driver pin 8, and also as the abutment 9 is forced against the supporting surface 6b under the influence of the cup springs 12, on rotation of the abutment 9 the clamping sleeve 6 is at first also turned in the same direction of rotation. By cooperation of the external thread 6a with the internal thread 2a, the clamping sleeve 6 moves to the left as in FIG. 1. By the clamping member 7 abutting against the flange 4b via the washer 21, the plunger 3 is moved to the left until the slide abuts against the workpiece. The distance covered in this case by the slide S from its open position until it abuts against the workpiece is referred to as the feed stroke. If this feed stroke is, for example, 2 mm, then the operating lever 10 must be pivoted through an angle $\beta$ of 60° for this, as in FIG. 3.

As soon as the slide S abuts against the workpiece, the torque increases, the further rotation of the clamping sleeve 6 is prevented by the threads 2a, 6a. Further rotation of the clamping member 7 is also prevented by the driver pin 8. The actual clamping stroke now takes place. On further rotation of the abutment 9 to the left, the studs 11 are straightened, i.e. the angle $\mu$ to the clamping sleeve axis A decreases. By this straightening of the studs 11, the distance between clamping member 7 and abutment 9 increases. Rotation of the abutment 9 is continued until the axes a of the studs 11 are inclined through about 3° relative to the clamping sleeve axis, opposite their starting position and beyond their dead center position parallel to the clamping sleeve axis A. In order to bring the studs 11 from their starting position to the position beyond their dead center position, the lever 10 must be pivoted through an angle $\alpha$ of about 22°. In this clamping position, as shown in FIG. 3, the operating lever 10 then abuts against the stop 16a of the clamping sleeve 6. Thus a stable clamping position is reached. Due to the increase in distance between clamping member 7 and abutment 9 during the clamping stroke by about 0.44 mm, the abutment is moved slightly to the right and in the process lifts off the supporting surface 6b of the clamping sleeve 6. The clamping force of the cup springs 12, which is preset by means of the adjusting sleeve 14, is then transmitted via the needle roller bearing 13, the abutment 9, the studs 11, the clamping member 7 and the flange 4b to the plunger 3 and hence to the slide. They bias the slide S with the preset clamping force against the workpiece. In case of yielding of the workpiece, the clamping force is maintained due to the elasticity of the cup springs 12, though it falls slightly.

Unclamping takes place in the reverse order, by pivoting the operating lever 10 to the right in the opposite direction of rotation, as in FIG. 3. It comes to rest on stop 16b, which ensures that the studs 11 are not tilted beyond the intended inclined position of 10° to the clamping sleeve axis. The compression spring 15 keeps the clamping member 7 in permanent abutment with the studs 11, and also causes the hollow spindle 4 of the plunger 3 to be moved to the right into the open position. As soon as the operating lever 10 abuts against stop 16b, the clamping sleeve 6 is turned clockwise as in FIGS. 2 and 3 until its stop face 19a abuts against the holding pin 20. Thus the operating lever 10 again adopts its position shown in dot-dash lines in FIG. 3. By rotation of the clamping sleeve 6 relative to the housing 2, the clamping sleeve moves to the right as in FIG. 1, and the plunger 3 can follow by the action of the compression spring 15. By means of the threaded rod 5, the slide S too is moved into the open position.

During quick-action clamping of workpieces, the angle of rotation of the operating lever 10 should be less than 180°, preferably less than 150°. This is guaranteed with the clamping device according to the invention. For the fact is that a feed stroke of 4 mm can be obtained by an angle of rotation β1 of 120°. This angle of rotation β1 is then followed by the angle α of 22°, which is required for performing the clamping stroke.

The embodiments of the invention in which an exclusive property or privilege is claimed are defined as follows:

1. In a clamping device for a machine vise having a movable clamping slide member and a mechanical servo mechanism, comprising:
   a stationary housing means on said machine vise having an internally threaded opening therein;
   an axially movable plunger acting in particular on said movable clamping slide;
   a clamping sleeve encircling said servo mechanism, said clamping sleeve being coaxial with said plunger and having an external thread threadedly engaged in said internally threaded opening;
   a clamping member axially slidable in said clamping sleeve and non-rotatably connected thereto, one end of said clamping member being supported on said plunger;
   an abutment member axially movably supported and rotatably supported to a limited extent in said clamping sleeve, said movement of said abutment member being between a first end position defining an open position of the clamping slide member and a second end position defining a clamping position of the clamping slide member;
   an operating lever connected to and projecting from said clamping sleeve;
   plural studs disposed between said clamping member and said abutment member, said studs, when in said first end position of said abutment member, being inclined at an acute angle to an axis of said clamping sleeve and, when in said second end position of said abutment member, being arranged approximately parallel to said axis of said clamping sleeve; the improvement wherein
   (a) a compression spring abuts at one end against said plunger and at the other end against said housing means to effectively bias said clamping member toward said abutment member to clamp said studs therebetween;
   (b) an adjusting sleeve disposed adjacent an end of said clamping sleeve abutting said abutment member;
   (c) said external thread is provided directly on an outer circumference of said clamping sleeve, concentrically adjacent said clamping member and said studs;
   (d) said adjusting sleeve is axially displaceable relative to said clamping sleeve by means of a fine thread, and plural cup springs are disposed between a side of said abutment member remote from said studs and said adjusting sleeve; and
   (e) stop means is provided between said clamping sleeve and said housing for limiting a rotational movement of said clamping sleeve relative to said housing in said open position whereby a rotation of said plunger will effect an axial movement of said plunger and said clamping slide member, and cause said clamping slide member to eventually engage a workpiece, thereafter, movement of said operating lever and said clamping sleeve connected thereto will cause rotative movement of said abutment member from said first end position to said second end position to re-orient said studs and to effect an amplification of the force applied by said clamping sleeve member to said workpiece, the relative positional relation between said adjusting sleeve and said clamping sleeve controlling the magnitude of the amplification of the force applied by said clamping sleeve member to said workpiece.

2. The clamping device according to claim 1, wherein said external thread on said clamping sleeve is a coarse thread.

3. The clamping device according to claim 2, wherein said external thread has a nominal diameter of at least 44 mm for a pitch of at least 10 mm.

4. The clamping device according to claim 3, wherein said external thread is a trapezoid thread Tr 52×12 (mm).

5. The clamping device according to claim 1, wherein an angle of rotation of said abutment member relative to said clamping sleeve is defined by stops in such a way that said studs in said clamping position of said abutment member are always moved slightly beyond their position parallel to the clamping sleeve axis.

6. The clamping device according to claim 5, wherein said angle of rotation of said abutment member relative to said clamping sleeve is less than 25°.

7. The clamping device according to claim 1, wherein a maximum angle of rotation of said operating lever relative to said housing means is less than approximately 150°.

8. The clamping device according to claim 1, wherein said clamping member and said abutment member are annular rings, and said plunger extends through both annular rings.

9. The clamping device according to claim 8, wherein said plunger comprises a flange on one side of which is supported said clamping member and on the other side of which is engaged said compression spring.

10. The clamping device according to claim 8, wherein said plunger is defined by a hollow spindle and is rotatable about a central axis common to said housing, said clamping member and said abutment member, and inside said hollow spindle is disposed a non-rotatable threaded rod which is supported by its free end projecting beyond the hollow spindle on said clamping slide member of said machine vise and in whose thread engages an internal thread provided on said hollow spindle.

11. The clamping device according to claim 10, wherein said hollow spindle extends out of said clamping sleeve adjacent said adjusting ring, and there has an operating handle secured thereto.

* * * * *